US012621055B2

(12) United States Patent
Burnside et al.

(10) Patent No.: US 12,621,055 B2
(45) Date of Patent: May 5, 2026

(54) CONFORMAL DIGITAL DISMOUNT ANTENNA

(71) Applicant: NORTHROP GRUMMAN SYSTEMS CORPORATION, Falls Church, VA (US)

(72) Inventors: Scott R. Burnside, McClellan, CA (US); Thomas J. Roush, Carmichael, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 313 days.

(21) Appl. No.: 18/456,169

(22) Filed: Aug. 25, 2023

(65) Prior Publication Data

US 2025/0070878 A1     Feb. 27, 2025

(51) Int. Cl.
*H04B 10/2575*      (2013.01)
*H01Q 1/27*      (2006.01)
(Continued)

(52) U.S. Cl.
CPC ......... *H04B 10/2575* (2013.01); *H01Q 1/273* (2013.01); *H01Q 1/38* (2013.01);
(Continued)

(58) Field of Classification Search
CPC ................ H04B 10/2575; H04B 1/40; H04B 2210/006; H01Q 1/273; H01Q 1/38;
(Continued)

(56) References Cited

U.S. PATENT DOCUMENTS 9,282,893 B2      3/2016  Longinotti-Buitoni et al.
9,432,119 B2*     8/2016  Copper ............. H04B 10/2575
(Continued)

FOREIGN PATENT DOCUMENTS

CN         104382569 A      3/2015

OTHER PUBLICATIONS

Wang, S.J. and Yu, H.L. (2021) Preparation of Cu@Ag Nanoparticles for Conductive Ink. Journal of Materials Science and Chemical Engineering (Year: 2021).*
(Continued)

*Primary Examiner* — Regis J Betsch
*Assistant Examiner* — Jose A. Miranda Gonzalez
(74) *Attorney, Agent, or Firm* — Tarolli, Sundheim, Covell & Tummino LLP

(57)          ABSTRACT

A conforming dismount antenna for use in a communication system includes a signal converter, a modulation component, a flexible fiber optic cable, and a flexible radiating element. The flexible fiber optic cable connects the conforming dismount antenna to a radio transceiver. The conforming dismount antenna bends to the contours of the user wearing the conforming dismount antenna or conforming to the contours of camouflage netting resting on a vehicle. When transmitting or receiving a broadcast, the conforming dismount antenna converts the radio frequency signal into a digital optical signal within the conforming dismount antenna. Communication systems including the conforming dismount antenna and methods of using the conforming dismount antenna are also described.

20 Claims, 5 Drawing Sheets

(51) Int. Cl.
  *H01Q 1/38*        (2006.01)
  *H01Q 3/00*        (2006.01)
  *H04B 1/40*        (2015.01)

(52) U.S. Cl.
  CPC .................. *H04B 1/40* (2013.01); *H01Q 3/00* (2013.01); *H04B 2210/006* (2013.01)

(58) Field of Classification Search
  CPC .......... H01Q 3/00; H01Q 1/22; H01Q 9/0407; H01Q 1/276; H01Q 1/40
  See application file for complete search history.

(56)                References Cited

U.S. PATENT DOCUMENTS

| | | | |
|---|---|---|---|
| 2011/0268449 A1 | 11/2011 | Berlin et al. | |
| 2014/0081631 A1* | 3/2014 | Zhu ..................... | G10L 21/0208 704/226 |
| 2014/0225805 A1 | 8/2014 | Pan et al. | |
| 2016/0072936 A1* | 3/2016 | Kim .................... | H04M 1/6058 455/569.1 |
| 2019/0036556 A1 | 1/2019 | Dinan et al. | |
| 2022/0190474 A1* | 6/2022 | Houser ................. | H01Q 5/307 |

OTHER PUBLICATIONS

Mohamadzade, et al.: "Recent Advances in Fabrication Methods for Flexible Antennas in Wearable Devices: State of the Art"; www.mdpi.com/journal/sensors; Sensors 2019, 19, 2312; doi:10.3390/s19102312.

Kitaev: "Protected qubit based on a superconducting current mirror"; http://arxiv.org/abs/cond-mat/0609441v2; Sep. 19, 2006, pp. 1-6.

WOISR (Notification of Transmittal of the International Search Report and the Written Opinion of the International Searching Authority) issued for corresponding PT/US2024/038014, mailed Oct. 25, 2024.

* cited by examiner

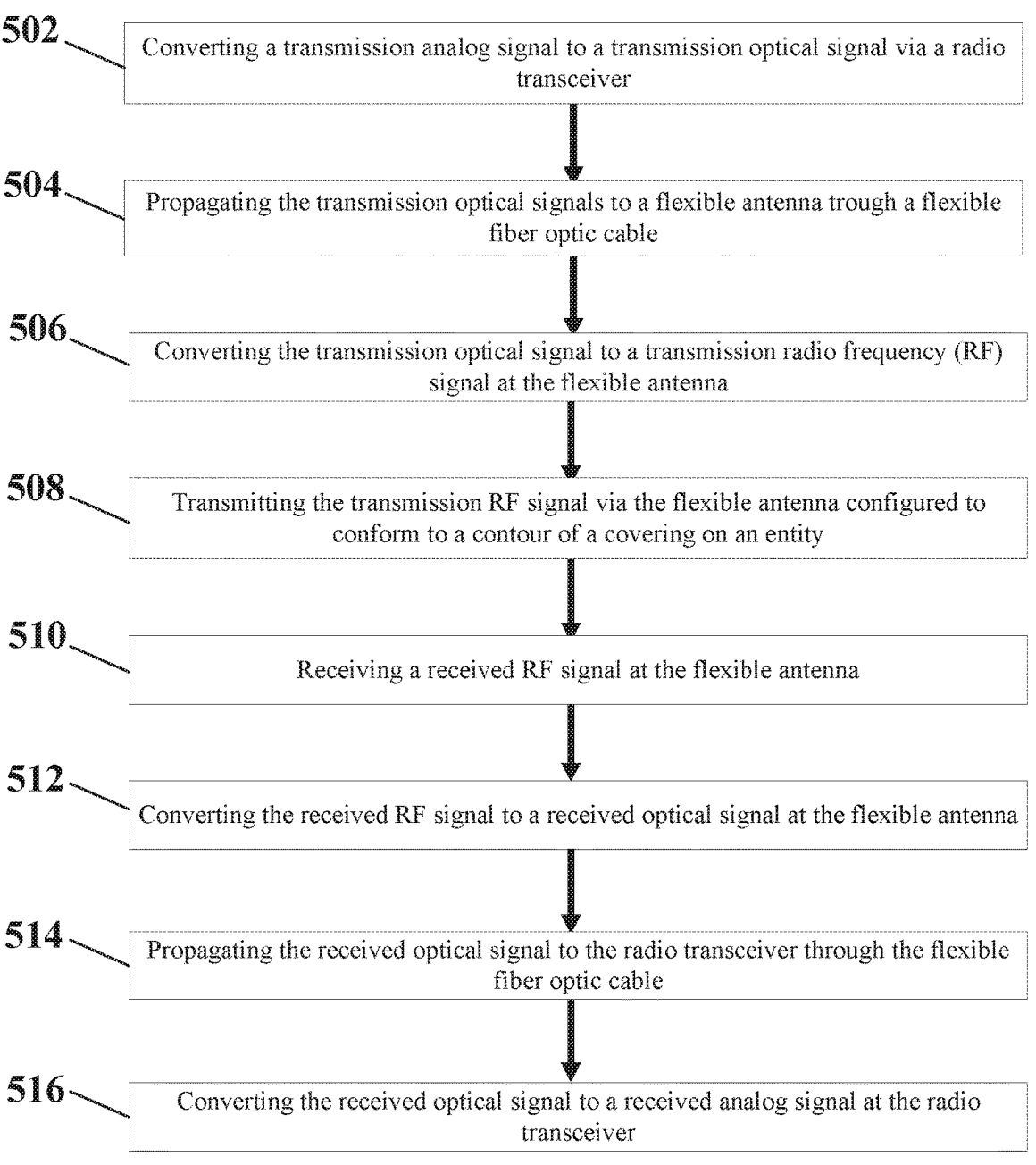

500

502 — Converting a transmission analog signal to a transmission optical signal via a radio transceiver 504 — Propagating the transmission optical signals to a flexible antenna trough a flexible fiber optic cable 506 — Converting the transmission optical signal to a transmission radio frequency (RF) signal at the flexible antenna 508 — Transmitting the transmission RF signal via the flexible antenna configured to conform to a contour of a covering on an entity 510 — Receiving a received RF signal at the flexible antenna 512 — Converting the received RF signal to a received optical signal at the flexible antenna 514 — Propagating the received optical signal to the radio transceiver through the flexible fiber optic cable 516 — Converting the received optical signal to a received analog signal at the radio transceiver

FIG. 5

CONFORMAL DIGITAL DISMOUNT ANTENNA

BACKGROUND

Dismount antennas are known for use in tactical communications during combat to keep ground forces connected while on the move or while holding a position. Dismount antennas are typically elongated devices extending from a soldier such that, during battlefield operations, the radio operator can be restricted from performing movements due to the size and location of the antenna element extending from the radio. The dismount antenna can also cause the radio operator to be identified as a target.

Many modern tactical voice radios have been known to incorporate linear polarized antennas allowing for longer range communication than circular polarized antennas of the same gain. Tactical dismount antennas are designed to work in the 30-512 MHz range. With the advancement of computer science, tactical voice radio can be encrypted, and large amounts of data can be sent over the airwaves in quick bursts of signals with more complex encryption.

Several different variations of dismount antenna designs have been developed. Whip and blade antenna structures are designed with a low visual profile, high gain, and good voltage standing wave ratio. Dismount antennas can be connected directly to a portable radio transceiver such that the antenna has a generally vertical orientation.

SUMMARY

The following is a brief summary of subject matter that is described in greater detail herein. This summary is not intended to be limiting as to the scope of the claims.

In a first example, a communication device comprising a radio frequency (RF) converter component is configured to convert the transmission optical signal to a transmitted RF signal and to convert a received RF signal to the received optical signal. A flexible fiber optic cable is configured to propagate the transmission and received optical signals between the signal converter and a radio transceiver. A flexible antenna is configured to conform to a contour of a covering on an entity. The flexible antenna is configured to transmit and receive the transmitted and received RF signals.

According to a second example, a method of communicating with a communication device includes converting a transmission analog signal to a transmission optical signal via a radio transceiver. The method includes propagating the transmission optical signal to a flexible antenna through a flexible fiber optic cable. The method includes converting the transmission optical signal to a transmission radio frequency signal at the flexible antenna. The method includes transmitting the transmission RF signal via the flexible antenna configured to conform to a contour of a covering on an entity. The method includes receiving a received RF signal at the flexible antenna. The method includes converting the received RF signal to a received optical signal at the flexible antenna. The method includes propagating the received optical signal to the radio transceiver through the flexible fiber optic cable. The method includes converting the received optical signal to a received analog signal at the radio transceiver.

In a third example, a wearable communication system includes a radio transceiver. The radio transceiver includes a microphone at a first position to obtain first audio signal data representative of a first vocal communication associated with speech by a first user. The radio transceiver includes a speaker at a second position to obtain second audio signal data representative of a second vocal communication associated with speech by a second user. The wearable communication system includes a signal converter configured to convert a transmitted analog signal to a transmitted optical signal and to convert a received optical signal to a received analog signal. The wearable communication system includes a flexible fiber optic cable configured to propagate the transmitted and received optical signals. The flexible fiber optic cable is coupled to the radio transceiver. The wearable communication system includes an optical transducer configured to convert the transmitted optical signal of the radio transceiver to a transmitted radio frequency signal and to convert a received RF signal to the received optical signal. The wearable communication system includes a flexible antenna configured to conform to a contour of a covering on an entity. The flexible antenna is configured to transmit and receive the transmitted and received RF signals.

BRIEF SUMMARY OF THE DRAWINGS

The general inventive concepts, as well as illustrative examples and advantages thereof, are described below in greater detail, by way of example, with reference to the drawings in which:

FIG. 5 is a block flow diagram for a method in which a digital antenna system performs communication in accordance with one or more examples described herein.

DETAILED DESCRIPTION

Figure 1:
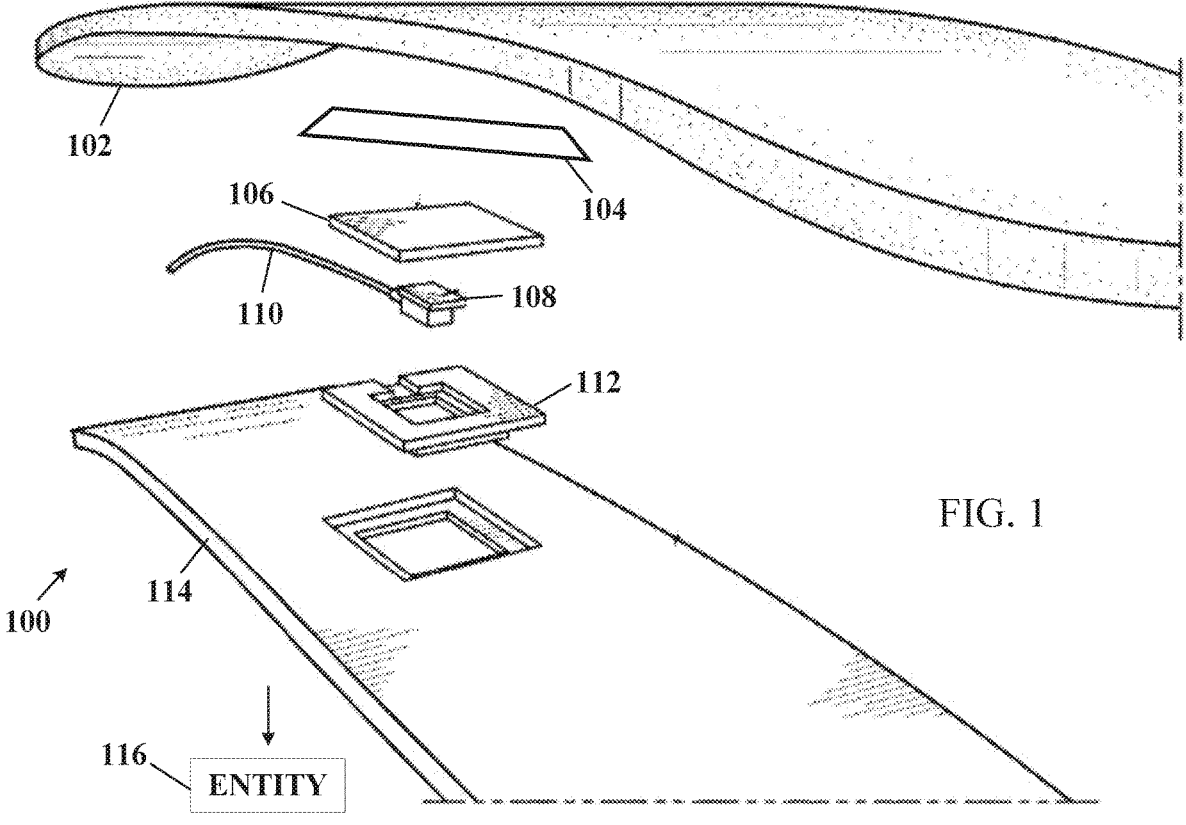
FIG. 1 illustrates an exploded view of a digital antenna system.

The following detailed description is merely illustrative and is not intended to limit examples and/or application or uses of examples. Furthermore, there is no intention to be bound by any expressed or implied information presented in the preceding Background or Summary sections, or in the Detailed Description section.

As used in the specification and the appended claims, the singular forms "a," "an," and "the" are intended to include the plural forms as well, unless the context clearly indicates otherwise.

Unless otherwise indicated, any element, property, feature, or combination of elements, properties, and features, may be used in any example disclosed herein, regardless of whether the element, property, feature, or combination was explicitly disclosed in the example. Features described in relation to any particular aspect described herein may be applicable to other aspects described herein provided the features are compatible with that aspect. In particular, features described herein in relation to the method may be applicable to the antenna product and vice versa.

One or more examples are now described with reference to the drawings, wherein like referenced numerals are used to refer to like elements throughout. In the following description, for purposes of explanation, numerous specific details are set forth in order to provide a more thorough understanding of the one or more examples can be practiced without these specific details, or with other methods, components, materials, etc. In other instances, well-known structures, materials, or operations are not shown or described in detail to avoid obscuring certain aspects.

Reference throughout this specification to "one example," or "an example," means that a particular feature, structure, or characteristic described in connection with the example is included in at least one example. Thus, the appearances of the phrase "in one example," "in one aspect," or "in an example," in various places throughout this specification are not necessarily all referring to the same example. Furthermore, the particular features, structures, or characteristics may be combined in any suitable manner in one or more examples.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Referring to FIG. 1, there is illustrated an exploded view of a digital antenna system 100 that can work in both a transmission mode and a receiving mode. The digital antenna system 100 is a multi-layered antenna system that can be available on or incorporated into a garment or covering. The system can include a protective layer 102 that mitigates impact and environmental damage. The protective layer 102 is the outermost layer of the system which obscures visual identification of communication means. A flexible radiating element 104 is secured beneath the protective layer and can consist of one or more radiating elements to allow for beam formation. Below the radiating elements is a spacer layer 106 that is made of a flexible dielectric material which can be configured to control the radiation characteristics of the flexible radiating element 104. A Radio Frequency (RF) distribution layer 108 is positioned beneath the spacer layer 106. The RF distribution layer 108 connects the electronics to the flexible radiating element via RF transmission lines. Beneath the RF distribution layer 108 is the electronics layer 112 that provides the interfacing functions of the digital antenna system 100. The interfacing functions include a fiber optic signal converter (not shown) for converting optical signals to RF signals, converting analog signals to digital signals, etc. The innermost layer of the digital antenna system 100 is a compressible material layer 114 that provides a buffering between the digital antenna system 100 and entity being covered.

The digital antenna system 100 can be a built-in part of a vehicle covering or gear that a user is wearing which reduces weight and prevents snagging an antenna on the user's surroundings. The digital antenna system 100 can connect to a transceiver (not shown) having transceiver circuitry (not shown) that is carried by the user, or mounted for the user to access. Flexible fiber optic transmission lines (not shown) provide suitable optical signal paths along the bendable material of the covering or gear. Particularly for a helmet application, when helmets are fabricated, they are often made using a compression lamination process. The digital antenna system 100 can be laid in as a specific layer in the process, without adding significant weight to the helmet.

Similarly, for clothing or backpacks, the system can be a sewn-in layer with the fabrics layer adding little weight or thickness.

In one example, the outermost protective layer 102 can conform to a shell defining shell exterior and a shell interior, and being configured to receive a wearer's head and extend to protectively cover the head circumferentially and vertically over the top of the wearer's skull. The protective layer 102 can be a thin composite flexible housing for protecting the lower layers and be a buffer between the digital antenna system 100 and a helmet exterior. The protective layer 102 can be an impact-resistant pad formed from materials designed to dissipate the force of impacts on the digital antenna system 100. For example, an impact-resistant pad can include a layer of elastomeric material. The elastomeric material may provide impact-resistance by absorbing and dissipating the force of impacts laterally along the surface of the elastomeric material. The number, shape, and size of the protective layer 102 in FIG. 1 is shown merely for the purposes of illustration, and is not intended to be limiting. The protective layer 102 in different numbers or having different shapes or sizes may be used without departing from the scope of the digital antenna system 100.

In another example, the protective layer 102 can be a soft layer to facilitate its application to a user's clothing. The protective layer 102 can be, for example, a film or a coating that can be applied to a top side of the digital antenna system 100, or it could be a portion of the user's clothing. The digital antenna system 100 is woven into the garment to create a cloth that is comfortable and conformable, and also to create bends in the material that allow transmitting and receiving signals to traverse. The protective layer 102 is an RF transparent material that provides good signal quality to the flexible radiating element 104 while also providing structural support and visual obscurity to the digital antenna system 100. The protective layer 102 can include micro-perforations that allow RF radiation to pass through but are not visible to the eye. Micro-perforations may include perforations through the material and isolated islands of material separated by moats or channels.

FIG. 1 shows the digital antenna system 100 is configured to include a flexible radiating element 104 for transmitting and receiving voice and data communications with a wearable communication platform. The flexible radiating element 104 can comprise an electrically active material made of a single wire, a thin wire mesh, a conductive fabric, conductive ink, or a plurality of graphite composite pieces to conform to the bending of material being worn by a user or covering a vehicle. The flexible radiating element 104 can have one or more parasitic elements (not shown) located adjacent to the flexible radiating element 104 to create an arraying effect and change the shape of the antenna when needed without the use of a mechanical device or motor.

The flexible radiating element 104 can be a driven array of low-gain dipole elements for transmitting and receiving omnidirectional radio frequency energy for the digital antenna system 100. The flexible radiating element 104 can be fed from an RF transmission line carrying RF energy that has been converted from an optical signal. When used for receiving, separate radio frequency currents from individual antenna elements combine in the transceiver (not shown) with the correct phase relationship to enhance signals received from the desired directions and cancel signals from undesired directions. The digital antenna system 100 can make use of different communication protocols combining wide coverage technologies such as but not limited to public land mobile networks (e.g. 2G to 5G systems, including machine to machine communications based on NB-IoT or M-Cat), local area networks (e.g. WiFi-802.11 protocols), body area networks (e.g. Bluetooth/Bluetooth low energy or near field communications), or wireless sensor networks (e.g. ZigBee, LoRa, eNOcean or IQRF, among others).

In another example the flexible radiating element 104 can be a microstrip patch printed directly into the digital antenna system 100 based on the deposition of a uniform layer of conductive ink paste on a flexible substrate. The employed ink in conventional screen-printing processes are usually based on silver or silver chloride, due to the low cost, conductivity, and flexibility in the deposition process. Conductive paste can be deposited into the flexible substrate by applying pressure with a mechanical palate, which displaces the conductive paste on the flexible substrate with a pattern that is given by a stencil that is located between the deposition head and the host substrate. Common connectors are usually microstrip launchers, which require soldering of the top connector pin to the microstrip access transmission and the bottom portion of the connector to the flexible radiating element 104. Alternatively, the RF connection can be made via RF feed-throughs or aperture coupling.

Below the flexible radiating element 104 is a spacer layer 106 made of dielectric material configured to control the radiation characteristics of the digital antenna system 100. The permittivity of the dielectric material used in the spacer layer 106 affects the radiation pattern of the flexible radiating element 104. When the flexible radiating element 104 is embedded in a high-permittivity material, the size of the flexible radiating element 104 can be reduced in accordance with the decreased wavelength of the electromagnetic waves in the immediate vicinity of the digital antenna system 100. By pairing circuit miniaturization techniques with the microstrip patch antennas embedded in high-permittivity materials, the digital antenna system 100 can be produced in a miniaturized form. With the use of high-permittivity materials, high-directivity antennas are able to transmit and receive information over greater distances.

Low-permittivity material in the spacer layer 106 provide a lower dielectric constant which is helpful to increase the transmission speed, reduce the delay, and decrease the loss of the signal. The lower the dielectric constant of the dielectric material used, the lower the signal delay and the higher the signal fidelity. Low dielectric polymer materials are known to be used with communication substrate materials (e.g., polytetrafluoroethylene (PTFE), liquid crystal polymer (LCP), and polyimide (PI) among others). The dielectric constant of some polymers are fairly large such as epoxy resin. In terms of electrical properties, low-permittivity material in the spacer layer 106 can have low loss and low leakage of current. With regards to mechanical properties, the low permittivity material has less adhesion and strength qualities than higher permittivity material.

The digital antenna system 100 can include higher or lower-permittivity material in the spacer layer 106 depending on the application. Garments and apparel would benefit from a more miniaturized digital antenna system 100, while camouflage netting used for covering a large vehicle would benefit from the capability of communicating from further distances.

Immediately beneath the spacer layer 106 is the RF feed layer 108 which connects the flexible radiating element 104 to the electronic components of the electronics layer 112. The RF feed layer 108 is an integrated signal distribution device connected to fiberoptic lines to connect to the electronic circuitry of the digital antenna system 100. The function of the RF feed layer 108 is to create multiple copies of a signal while minimally degrading its integrity. It is designed to distribute a low noise RF signal to multiple usage points where the flexible radiating element 104 requires a low noise RF signal to be employed. The RF feed layer 108 can employ an input to receive an RF signal converted from an optical signal in the electronics layer 112 while providing multiple outputs to a plurality of flexible radiating elements 104. The input signal can be conditioned by a circuit limiter (not shown), which provides a fixed output level as well as high input gain. The high input gain allows the amplification to provide the specified output power over the entire input power range.

The RF feed layer 108 is used to connect the flexible radiating element 104 to the electronics layer. The RF feed layer 108 can include a splitter or combiner of RF signals and can be used to deliver a centralized reference signal to a plurality of flexible radiating elements 104. A wide range of applications can be applied to the digital antenna system 100 (e.g., GSM, CDMA, LTE, Bluetooth, GNSS (GPS, GLONASS, and Galileo), qualification of active and passive cellular and wireless front-end components, research and development (R&D), air interface emulation, Wi-Fi communication testing, and fading simulation). The digital antenna system 100 is generally radio based usually providing an air interface point to point link between an active base station and a mobile station.

An electronics layer 112 is provided under the RF feed layer 108 on a thin, heat resistant flexible material made of polymers (e.g., polyimide and polyethylene terephthalate (PET)) combined with thin copper layers. Flexible substrates are used in the electronics layer 112 to make multi-layered boards complete with microchips, interfaces, and integrated circuits. Flexible substrates are used as the printed circuit board (PCB) because its flexibility renders it resistant to the impacts of tremors, vibrations, and intense levels of heat while allowing the digital antenna system 100 to conform to the bending of the material it is embedded in while being worn by a user or while resting on a vehicle. PCBs made of flexible substrate function with minimal errors due to the lack of wiring components or mechanical connectors.

The electronics layer 112 is electrically connected to a radio transceiver (not shown) via a flexible fiber optic cable 110. The high frequency electronics component is a circuit that controls transmission and reception of the digital antenna system 100 based on various high frequency signals and the power signal. Thereby, the electronics layer can supply the high-frequency signal RF to each of the flexible radiating elements 104. When the high frequency signal RF is supplied, a current flows in the radiation elements 104 in a predetermined direction, and a polarized wave parallel to the direction in which the current flows is radiated.

The electronics layer 112 includes the function of interfacing the flexible RF distribution layer to the fiberoptic cable 110, using a fiberoptic converter. The fiberoptic converter also includes a laser interface for connection to the fiber cable 110. Additionally, fiber optic conversion allows the digital antenna system 100 to utilize flexible compact fiber optic cables rather than bulky coaxial cables. The electronics layer 112 can include analog to digital conversion, digital to analog conversion, an RF filter, an amplifier, and an RF switch.

The innermost layer encloses the digital antenna system 100 and provides a buffering between the digital antenna system 100 and the user. In one example, the compressible material layer 114 can be the inner lining of protective clothing. Another example can be a cushion bendable material layer in a helmet. The digital antenna system 100 is integral with, or attachable to an entity 116, such as any wearable garment, protective gear, or vehicle covering. Thus, the digital antenna 100 is disposed on the entity 116 such that the entity 116 is located on a side of the compressible material layer 114 opposite that of the electronics layer 112, as illustrated in FIG. 1. Thereby, the compressible material layer 114 can be a rubberized foam layer, a silicon casing layer, or any other suitable material. The flexible radiating element 104, the spacer layer 106, the RF distribution layer 108, and the electronics layer can reside in the space suitably fastened between the protective layer 102 and the compressible material layer 114 as can best be understood by referring to FIG. 1.

Figure 2:
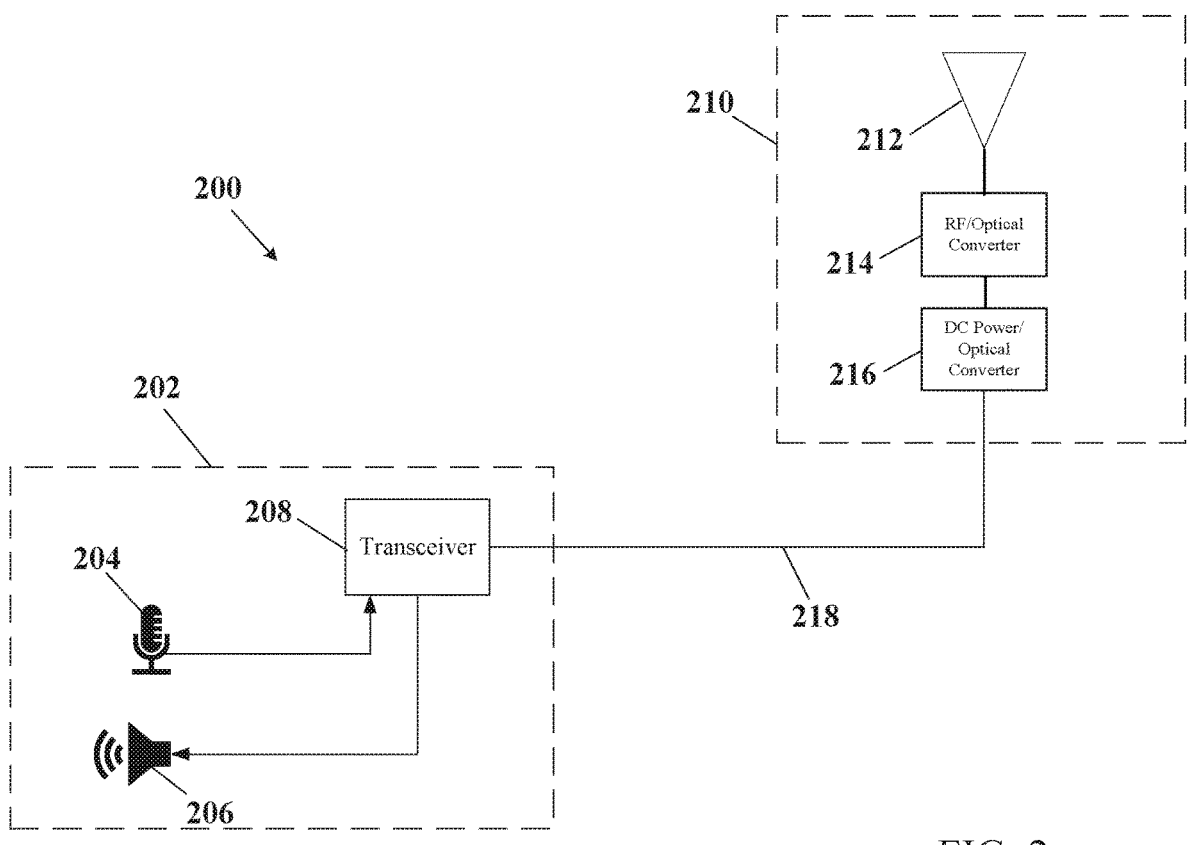
FIG. 2 illustrates the overall system block diagram.

Referring now to FIG. 2, there is illustrated diagrammatically a further example of the digital antenna system 200 which includes the soldier/truck mounted radio 202 including a microphone 204, speaker 206, and a transceiver 208. The conformal digital antenna 210 is shown including a flexible antenna element 212, an RF/fiber converter 214, and a DC power/fiber converter 216. For example, the digital antenna system 200 can be a flexible fiber optic cable 218 that couples the transceiver 208 to the conformal digital antenna 210.

A microphone 204, at a first position within the soldier/truck mounted radio 202, obtains audio signal data representative of vocal communication associated with speech by a user. The conformal digital antenna 210 processes the audio signal data to provide a clean signal output to be transmitted by the digital antenna system 200. The soldier/truck mounted radio 202 includes the transceiver 208 to transmit the vocal communication of the user to another device and receive communications from other devices. The other devices can be user equipment or Internet of Things devices. A speaker 206, at a second position within the soldier/truck mounted radio 202, outputs an audio signal representative of vocal communication associated with speech received from the conformal digital antenna 210. The conformal digital antenna 210 processes received audio signal data to provide a clean signal input to be received by the digital antenna system 200.

The digital optical signal to be transmitted is converted to an RF signal by an RF/Optical Converter 214 within the conformal digital antenna 210. The RF/Optical Converter 214 converts the signals from the soldier/truck mounted radio 202 to a format that can be handled by the flexible antenna element 212. The RF/Optical Converter 214 converts the optical signal into a frequency which can be assigned any frequency that is compatible with the digital antenna system 200. The RF/Optical Converter 214 produces a broadcast RF signal that can be fed into the flexible antenna element 212. Likewise, the signal that is received by the conformal digital antenna 210 to be converted into a digital optical signal by the RF/Optical Converter 214.

Vocal communication for transmission is spoken into the microphone 204 of the soldier/truck mounted radio 202 by the user. That vocal communication becomes an analog signal in the soldier/truck mounted radio 202 and converted to a digital signal to be propagated across the flexible fiber optic cable 218 to the conformal digital antenna 210. The transmission optical signal is converted to a transmission radio signal and emitted via the flexible radiating element 212. When receiving an RF signal by the conformal digital antenna 210, the RF signal is converted to an optical signal to be propagated across fiber optic transmission lines within the conformal digital antenna 210 and across the flexible fiber optic cable 218 to the soldier/truck mounted radio 202 to be converted to audible vocal communication to the user.

A DC power/optical converter 216 is included in the conformal digital antenna 210 to convert analog signals to digital optical signals and digital optical signals to analog signals. Upon receiving a signal to the conformal digital antenna 210, the signal is then converted to a digital optical signal by the DC power/optical converter 216 for propagation across the flexible fiber optic cable 218 to the soldier/truck mounted radio 202. Transmitted digital optical signals originate in the radio soldier/truck mounted radio 202 which are to be converted to an RF signal within the conformal digital antenna 210. Thereby, the transmission RF signal is emitted out by the flexible radiating element 212.

Figure 3:
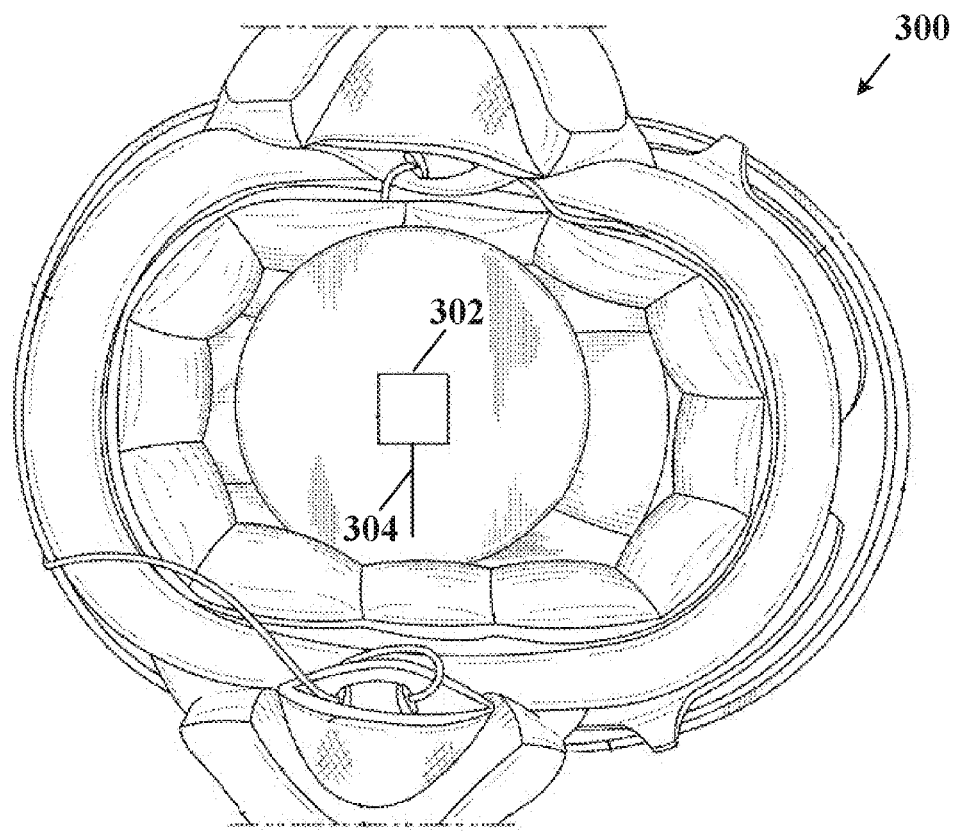
FIG. 3 illustrates the mounting of a conformal digital antenna in a typical helmet.

Referring now to FIG. 3, considering variations and alternative examples of a conformal digital dismount antenna, it is possible that a digital dismount antenna could be secured to a wearable garment or covering to provide a low-impact unrestrictive antenna system for communications, data connections, telemetry, etc. Flexible communication means include means for conforming to all forms of apparel, protective gear, obscuring coverings, or structures.

In FIG. 3, there is illustrated a head-protective helmet 300 including a conformal digital antenna 302 mounted on the helmet which is the first example of the present application and is beneficial for using a radio transceiver, operating any wireless communication devices, or communication in the intercom mode between a plurality of users. The conformal digital antenna 302 mounted to the head-protective helmet 300 worn by the user can receive and transmit voice and/or data communications.

Although placing the conformal digital antenna 302 on the vertex of the head-protective helmet 300 is shown, other bodily areas of the user can be utilized including across the back, across the chest, down the sleeve, down the pant leg, etc. The conformal digital antenna 302 can be embedded in the interior of the head-protective helmet 300 or mounted on the exterior of the head-protective helmet 300. Thus, the head-protective helmet 300 can correspond to the entity illustrated in FIG. 1. In one example, the conformal digital antenna 302 bends around the contour of the crown of the head, which enables the user to communicate hands-free having the dismount antenna embedded inside the head-protective helmet 300.

The head-protective helmet 300 can include a suitable rigid outer shell having the conformal digital antenna 302 fit to the contour of the helmet. The conformal digital antenna 302 can be attached to a suitable soft material covering that allows for the conformal digital antenna 302 to bend around the user's head or folding of the material. In the example of FIG. 3, the conformal digital antenna 302 is mounted to the garment by sew in, hook and loop pads, adhesive, rivet, or other suitable fasteners. The conformal digital antenna 302 can be embedded within, lie on, or rest under the surface of the garment.

A flexible fiber-optic cable 304 is coupled to the conformal digital antenna 302 for connecting to the radio transceiver (not shown). The flexible fiber-optic cable 304 also runs along the contour of the user's body and can also be embedded within, lie on, or rest under the surface of the garment equipped with the conformal digital antenna 302. The flexible fiber-optic cable 304 is lightweight, thin, and unnoticeable as it can be run through the user's clothing, backpack, armor, helmet, etc. By connecting the conformal digital antenna 302 directly to the radio transceiver via the flexible fiber-optic cable 304, the user has a wider range of motion of the limbs.

The jacket of the flexible fiber-optic cable 304 is covered in a sheath and can be formed of a resin material such as polyethylene, flame retardant polyethylene, polyvinyl chloride, and other suitable polymer materials. The core of the flexible fiber-optic cable 304 can contain a large number of optical fiber cords to transmit or receive information via optical signal from the radio transceiver (not shown) or an outside source.

Figure 4:
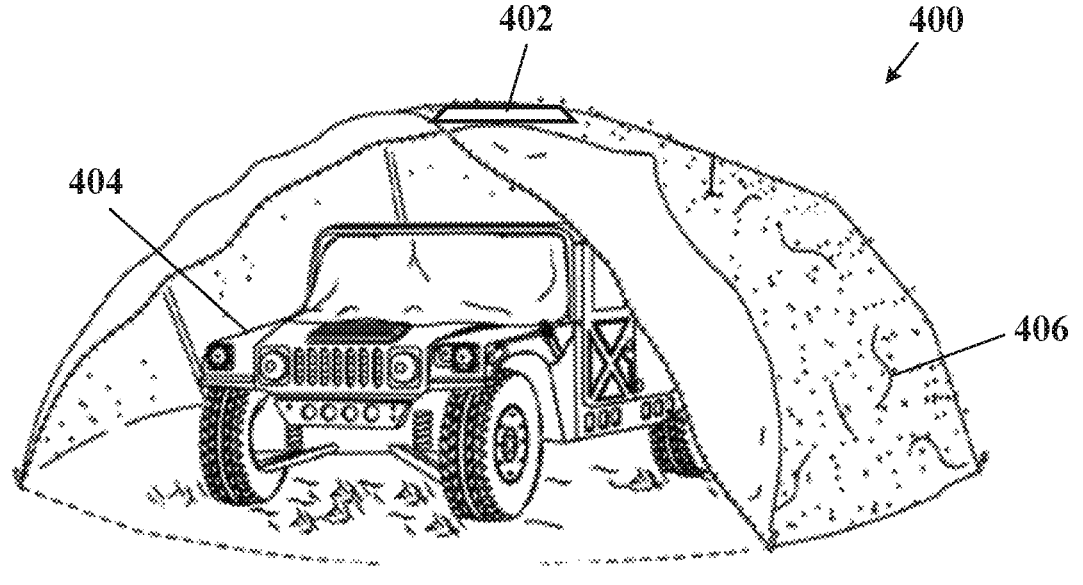
FIG. 4 illustrates the mounting of a conformal digital antenna in a camouflage netting.

Referring now to FIG. 4, there is illustrated a camouflage netting 400 including the conformal digital antenna 402 covering an all-terrain vehicle 404. The camouflage netting 400 that covers the all-terrain vehicle 402 can correspond to the entity illustrated in FIG. 1.

When incorporating the camouflage netting 400 described herein and the camouflage netting 400 is secured around a physical item, the conformal digital antenna 402 provides radio transceiver communication. The camouflage netting 400 can be of any stitch construction suitable for the end uses, including but not limited to woven, knitted, nonwoven, and tuft textiles, or the like. Woven textiles can include, but are not limited to, plain, satin, twill, basketweave, poplin, and crepe weave textiles. Nonwoven fabrics or substrates can be formed to include the conformal digital antenna 402 from many process such as, melt blowing processes, spun bonding processes, air laying processes, needle punched, and bonded carded web processes. The openness of the camouflage netting 400 may vary, but is preferably small enough as not to reveal the conformal digital antenna 402 and flexible fiber optic cable 406 to be concealed.

In one example, the fiber of the camouflage netting 400 can be a protective layer of the conformal digital antenna 402 and flexible fiber optic cable 406. The conformal digital antenna 402 and flexible fiber optic cable 406 are able to bend to the contour of the camouflage netting 400 resting on the all-terrain vehicle 404.

The conformal digital antenna 402 and flexible fiber optic cable 406 can be attached to the camouflage netting 400 by any known means, including but not limited to adhesive, stitching, and ultrasonic welding. The attachment may be at regular or irregular intervals and may be in a set pattern, such as a plurality of straight lines. The conformal digital antenna 402 and flexible fiber optic cable 406 is attached to the camouflage netting 400 such that at least a portion of the conformal digital antenna 402 and flexible fiber optic cable 406 is oriented out of the plane of the camouflage netting 400. The resulting non-uniform angles gives the camouflage netting 400 including the conformal digital antenna 402 and flexible fiber optic cable 406 more of a visual camouflage element and helps the camouflage fabric bend in with the contour of the all-terrain vehicle 404.

The camouflage netting 400 including the conformal digital antenna 402 and flexible fiber optic cable 406 may be printed with a visual camouflage pattern. The camouflage pattern may be formed by any known method including printing or dyeing. For example, the conformal digital antenna 402 and flexible fiber optic cable 406 may be dyed black, and the woven sheet may be dyed in various random patterns of green, brown, and black to conform to the colors of a forest terrain in which the camouflage construction is to be employed. Additionally, the pattern formed may be for desert or other terrain.

Depending on the type of physical item that is being camouflaged by the camouflage netting 400 including the conformal digital antenna 402 and flexible fiber optic cable 406 and the environment in which it operates, the need for a plurality of conformal digital antenna 402 and flexible fiber optic cable 406 can vary. For example, for certain types of transmission to manned or unmanned aircraft, command centers, or field teams, communication may be more important than concealment. The conformal digital antenna 402 can be formed by a plurality of radiating elements (not shown) to provide beam formation for directional signal transmission or reception. When receiving, information from different sensors is combined in a way where the expected pattern of radiation is preferentially observed.

Referring now to FIG. 5, illustrated is a flow diagram 500 for a digital antenna system performing communication in accordance with one or more examples described herein.

At 502, the flow diagram 500 comprises converting a transmission analog signal to a transmission optical signal via a radio transceiver.

At 504, the flow diagram 500 comprises propagating the transmission optical signals to a flexible antenna trough a flexible fiber optic cable.

At 506, the flow diagram 500 comprises converting the transmission optical signal to a transmission radio frequency (RF) signal at the flexible antenna.

At 508, the flow diagram 500 comprises transmitting the transmission RF signal via the flexible antenna configured to conform to a contour of a covering on an entity.

At 510, the flow diagram 500 comprises receiving a received RF signal at the flexible antenna.

At 512, the flow diagram 500 comprises converting the received RF signal to a received optical signal at the flexible antenna.

At 514, the flow diagram 500 comprises propagating the received optical signal to the radio transceiver through the flexible fiber optic cable.

At 516, the flow diagram 500 comprises converting the received optical signal to a received analog signal at the radio transceiver.

The performing communication can further comprise filtering the transmitted and received RF signals through an RF filter to provide a band-pass, a band-stop, a low-pass, or a high-pass of frequencies in the transmitted and received RF signal.

The performing communication can further comprise amplifying the transmitted RF signal to convert a low-power RF signal to a higher-power RF signal, wherein an amplifier drives the flexible antenna.

The performing communication can further comprise switching a path configuration of the transmitted and received RF signals by an RF switch.

The above description includes non-limiting aspects of the various examples. It is, of course, not possible to describe every conceivable combination of components or methods for purposes of describing the disclosed subject matter, and one skilled in the art may recognize that further combinations and permutations of various examples are possible. The disclosed subject matter is intended to embrace all such alterations, modifications, and variations that fall within the spirit of the appended claims.

With regard to the various functions performed by the above described components, the terms (including a reference to a "means") used to describe such components are intended to also include, unless otherwise indicated, any structure(s) which performs the specified function of the described component (e.g., functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited to such examples. In addition, any aspect or design described herein as "exemplary" and/or "demonstrative" is not necessarily to be construed as preferred or advantageous over the other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The description of illustrated examples of the subject disclosure as provided herein, including what is described in the Abstract, is not intended to be exhaustive or to limit the disclosed examples to the precise forms disclosed. While specific examples are described herein for illustrative purposes, various modifications are possible that are considered within the scope of such examples, as one skilled in the art can recognize. In this regard, while the subject matter has been described herein in connection with various examples and corresponding drawings, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

What is claimed is:

1. A communication device comprising:
   a radio frequency (RF) converter component configured to convert the transmission optical signal to a transmitted RF signal and to convert a received RF signal to the received optical signal; and
   a flexible fiber optic cable configured to propagate the transmission and received optical signals between the signal converter and a radio transceiver; and
   a flexible antenna disposed on an entity and being configured to conform to a contour of the entity, the flexible antenna being configured to transmit and receive the transmitted and received RF signals, the flexible antenna comprising:
      a compressible foam material providing a buffer between the flexible antenna and the entity;
      an electronics layer disposed on the compressible foam layer;
      a spacer disposed over the electronic layer, the spacer configured to control radiation characteristics of the flexible antenna; and
      a flexible protective encasing disposed on the compressible foam layer and over the electronic layer and the spacer.

2. The communication device of claim 1, wherein the electronic layer includes conducting traces that conform to the contour of the covering.

3. The communication device of claim 2, wherein the electronics layer comprises an RF filter, an amplifier, and an RF switch.

4. The communication device of claim 1, wherein the spacer comprises a dielectric material having a lower dielectric constant to mitigate signal loss.

5. The communication device of claim 4, wherein the dielectric material provides a higher dielectric constant to control the radiation characteristics of the flexible antenna.

6. The communication device of claim 1, wherein the flexible antenna comprises one or more radiating elements disposed on the spacer to provide an arraying effect for beamforming.

7. The communication device of claim 6, wherein the one or more radiating elements comprises a wire mesh, a conducting fabric, a conductive ink, or a plurality of graphite composite pieces.

8. The communication device of claim 1, wherein the flexible protective encasing is an uppermost layer of the flexible antenna and comprises an RF transparent material.

9. The communication device of claim 1, wherein the compressible foam material is an inner most layer of the flexible antenna.

10. A method of communicating with a communication device, the method comprising:
    providing a flexible antenna disposed on an entity, the flexible antenna configured to conform to a contour of the entity, the flexible antenna comprising:
       a compressible foam material providing a buffer between the flexible antenna and the entity;
       an electronics layer disposed on the compressible foam layer;
       a spacer disposed over the electronic layer, the spacer configured to control radiation characteristics of the flexible antenna; and
       a flexible protective encasing disposed on the compressible foam layer and over the electronic layer and the spacer;
    converting a transmission analog signal to a transmission optical signal via a radio transceiver;
    propagating the transmission optical signal to the flexible antenna through a flexible fiber optic cable;
    converting the transmission optical signal to a transmission radio frequency (RF) signal at the flexible antenna;
    transmitting the transmission RF signal via the flexible antenna;
    converting the received RF signal to a received optical signal at the flexible antenna;
    propagating the received optical signal to the radio transceiver through the flexible fiber optic cable; and
    converting the received optical signal to a received analog signal at the radio transceiver.

11. The method of claim 10, further comprising filtering the transmitted and received RF signals through an RF filter to provide a band-pass, a band-stop, a low-pass, or a high-pass of frequencies in the transmitted and received RF signal.

12. The method of claim 10, further comprising amplifying the transmitted RF signal to convert a low-power RF signal to a higher-power RF signal, wherein an amplifier drives the flexible antenna.

13. The method of claim 10, further comprising switching a path configuration of the transmitted and received RF signals by an RF switch.

14. The method of claim 10, wherein the flexible antenna comprises one or more radiating elements to provide an arraying effect for beamforming.

15. The method of claim 10, wherein the flexible antenna comprises a wire mesh, a conducting fabric, a conductive ink, or a plurality of graphite composite pieces.

16. A wearable communication system comprising:

a radio transceiver comprising a microphone at a first position to obtain first audio signal data representative of a first vocal communication associated with speech by a first user and a speaker at a second position to obtain second audio signal data representative of a second vocal communication associated with speech by a second user;

a signal converter configured to convert a transmitted analog signal to a transmitted optical signal and to convert a received optical signal to a received analog signal;

a flexible fiber optic cable configured to propagate the transmitted and received optical signals, wherein the flexible fiber optic cable is coupled to the radio transceiver;

an optical transducer configured to convert the transmitted optical signal of the radio transceiver to a transmitted radio frequency (RF) signal and to convert a received RF signal to the received optical signal; and a flexible antenna disposed on an entity and being configured to conform to a contour of the entity, the flexible antenna being configured to transmit and receive the transmitted and received RF signals, the flexible antenna comprising:

a compressible foam material providing a buffer between the flexible antenna and the entity;

an electronics layer disposed on the compressible foam layer;

a spacer disposed over the electronic layer, the spacer configured to control radiation characteristics of the flexible antenna; and a flexible protective encasing disposed on the compressible foam layer and over the electronic layer and the spacer.

17. The wearable communication system of claim 16, further comprising an RF filter configured to provide band-pass filtering, band-stop filtering, low-pass filtering, or high-pass filtering of frequencies in the transmitted and received RF signal.

18. The wearable communication system of claim 16, further comprising an amplifier configured to drive the flexible antenna, wherein the transmitted RF signal is amplified from a low-power RF signal to a higher-power RF signal.

19. The wearable communication system of claim 16, further comprising an RF switch configured to switch a path configuration of the transmitted and received RF signal.

20. The wearable communication system of claim 16, wherein the flexible antenna comprises one or more radiating elements to provide an arraying effect for beamforming.

* * * * *